US009027470B1

(12) United States Patent
Magner (10) Patent No.: US 9,027,470 B1
(45) Date of Patent: May 12, 2015

(54) FOOD CONDITION MAINTAINING DEVICE (75) Inventor: Erik Magner, Fort Wayne, IN (US)

(73) Assignee: Meister Cook LLC, Fort Wayne, IN (US)

( * ) Notice: Subject to any disclaimer, the term of this patent is extended or adjusted under 35 U.S.C. 154(b) by 0 days.

(21) Appl. No.: 13/423,003

(22) Filed: Mar. 16, 2012

Related U.S. Application Data (60) Provisional application No. 61/465,359, filed on Mar. 18, 2011.

(51) Int. Cl.
*A47J 36/24* (2006.01)

(52) U.S. Cl.
CPC ........................................ *A47J 36/24* (2013.01)

(58) Field of Classification Search
CPC .................................................... A47J 36/2483
USPC ..................................... 99/473, 474, 476, 483
See application file for complete search history.

(56) References Cited

U.S. PATENT DOCUMENTS

| 3,088,396 | A | * | 5/1963 | Proffitt ........................ 99/443 R |
| 3,186,185 | A | * | 6/1965 | Bently et al. .................... 62/255 |
| 3,306,068 | A | * | 2/1967 | Allgeyer et al. ................. 62/256 |
| 3,369,375 | A | * | 2/1968 | Gerweck et al. ................ 62/256 |
| 3,392,544 | A | * | 7/1968 | Perez ............................. 62/256 |
| 3,628,447 | A | * | 12/1971 | Levenback ...................... 99/341 |
| 3,756,038 | A | * | 9/1973 | MacMaster et al. ............. 62/256 |
| 3,771,323 | A | * | 11/1973 | Simons et al. ................... 62/89 |
| 3,942,426 | A | * | 3/1976 | Binks et al. ..................... 99/473 |
| 4,038,968 | A | * | 8/1977 | Rovell .......................... 126/261 |
| 4,050,368 | A | * | 9/1977 | Eakes ............................. 454/57 |
| 4,106,305 | A | * | 8/1978 | Ibrahim ........................... 62/89 |
| 4,233,495 | A | * | 11/1980 | Scoville et al. ................ 219/386 |
| 4,307,286 | A | * | 12/1981 | Guibert ......................... 219/400 |
| 4,369,631 | A | * | 1/1983 | Abraham ........................ 62/82 |
| 4,369,632 | A | * | 1/1983 | Abraham ........................ 62/82 |
| 4,426,923 | A | * | 1/1984 | Ohata ............................ 99/468 |
| 4,455,478 | A | * | 6/1984 | Guibert ......................... 219/400 |
| 4,499,818 | A | | 2/1985 | Strong |
| 4,936,824 | A | * | 6/1990 | Koch et al. ..................... 600/22 |
| 4,960,100 | A | * | 10/1990 | Pellicane ...................... 126/21 A |
| 5,523,456 | A | * | 6/1996 | Stokker et al. .................. 560/10 |
| 6,114,659 | A | | 9/2000 | Finck et al. |
| 6,261,621 | B1 | | 7/2001 | Stanger et al. |
| 2005/0103212 | A1 | * | 5/2005 | Cronin et al. ................... 99/467 |
| 2005/0211109 | A1 | * | 9/2005 | Majchrzak et al. .............. 99/468 |

(Continued)

OTHER PUBLICATIONS

U.S. Appl. No. 12/557,241, "Apparatus for Extending the Holding Time for Food", filed Sep. 10, 2009, assigned to the assignee of the present application.

*Primary Examiner* — Dana Ross
*Assistant Examiner* — John J Norton
(74) *Attorney, Agent, or Firm* — Kevin R. Erdman; Brannon Sowers & Cracraft PC (57) ABSTRACT

The inventive food holding apparatus comprises a holding area that accommodates food and warms the food with heat radiated by a bottom surface and with warm convection air. Part of the convection air forms an air curtain having a Bernoulli effect that removes excess moisture from the external surface of the food and maintains the food in a warm, crisp condition. The apparatus conditions food to attain a biologically safe noncooking temperature and to retain its freshly cooked texture and internal moisture for more than two hours. This lets restaurants serve the food longer to its customers, allowing efficient batch cooking and significantly decreasing food waste.

13 Claims, 12 Drawing Sheets

(56) References Cited

U.S. PATENT DOCUMENTS

| | | | |
|---|---|---|---|
| 2009/0199723 A1* | 8/2009 | Veltrop et al. | 99/427 |
| 2011/0252813 A1* | 10/2011 | Veltrop | 62/3.3 |
| 2011/0278278 A1* | 11/2011 | Emerich et al. | 219/400 |
| 2012/0051722 A1* | 3/2012 | Humphrey et al. | 392/379 |
| 2013/0175253 A1* | 7/2013 | Shei et al. | 219/400 |

* cited by examiner

100 # FOOD CONDITION MAINTAINING DEVICE

CROSS-REFERENCE TO RELATED APPLICATIONS

This application claims the benefit of U.S. Provisional Application No. 61/465,359, filed Mar. 18, 2011, the disclosure of which is explicitly incorporated by reference herein.

BACKGROUND ART

Restaurants use food-holding cabinets to keep fried food (e.g., french fries, fried onions, and hash browns), rethermalized fried food (e.g., frozen pre-fried french fries that are baked in a convection oven shortly before serving), and non-fried food (e.g., bread) hot and crisp longer before serving the food to customers.

The typical frying process includes quickly heating food in a deep fryer at around and above 350 degrees F. This frying process quickly removes moisture from the surface of the fried food, giving it a hot, crisp appearance. The typical rethermalizing process includes baking frozen pre-cooked food in a baking oven, such as a convection oven, at around and above 350 degrees F.

Fried food quickly deteriorates once removed from its primary cooking source. The typical hold time for fried food is between 5 and 7 minutes. Rethermalized fried food typically has a hold time of only 3 to 5 minutes because its crisp surface (which acts as a barrier to loss of food heat and internal moisture) is thinner than that of recently fried food. Thereafter, the food becomes soft and develops a greasy appearance. Internal food moisture quickly creeps towards and softens the outer surface of the food, leading to many customer complaints about greasy and old food.

Patents such as U.S. Pat. Nos. 4,499,818; 6,114,659; and 6,261,621 describe the use of radiant heat and/or convection air to keep food hot and crisp. In 1985, U.S. Pat. No. 4,499,818 described the original idea of improving the holding time of fried food. U.S. Pat. No. 6,261,621 described a fried food-holding area having recirculating hot air forced on and about fried food items, a lower heater, and an upper heater made of overhead heating lamps. Many tests have shown that overhead heating lamps in any application cause fried food to quickly develop a moist outer surface. U.S. Pat. No. 6,114,659 described a food-holding bin having a base for holding food to be warmed. The base had first and second opposed edges, third and fourth opposed edges, and first and second end walls disposed at the first and second opposed edges of the base. Regions above the base and along the third and fourth opposed edges between the first and second end walls were substantially open to ambient atmosphere.

SUMMARY

Embodiments of the inventive holding apparatus keep the interior of food held in a holding area warm and moist and the exterior surface of the food warm and crisp by applying to the food a combination of radiant heat, flowing warm convection air, a warm air curtain, and a Bernoulli effect. An air flow assembly heats a bottom surface of the holding area, which radiates heat to the food, and generates a flow of warm convection air that the assembly applies to and about the food. The air flow assembly creates from a portion of the flow of warm convection air an air curtain that flows within the holding area apart from the food to generate negative pressure through a Bernoulli effect, which helps to evaporate and remove excess moisture from the food surface. An opening in the holding area allows operators of restaurants and kitchens easy access to the food. Tests show that the embodiments can extend the serviceable holding time of food to more than two hours, letting restaurants serve food held by the apparatus for longer times to their customers and benefit from efficiently cooking food in batches and from significantly decreasing the waste of food.

One aspect of the invention is the development of a holding system that maintains warm, internally moist, crisp food with a balanced combination of one or more of radiant heat, warm convection air, a warm air curtain, and a Bernoulli effect.

BRIEF DESCRIPTION OF THE SEVERAL VIEWS OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF EMBODIMENTS OF THE INVENTION

Embodiments described and disclosed below are not intended to be exhaustive or to limit the invention to the precise forms disclosed in the following detailed description. Rather, the embodiments are chosen and described so that others skilled in the art may utilize their teachings.

Various embodiments of apparatus 10 described here apply to holding area 13 a balanced combination of radiant heat, warm air convection, insulating warm air curtain 61 (a flow of coherent air), and a negative pressure region from a Bernoulli effect resulting from warm air curtain 61 to quickly stop food in holding area 13 from cooking and to hold the food at a biologically safe, satisfying temperature (from about 140 degrees F. to about 190 degrees F., preferably from about 155 degrees F. to about 175 degrees F.). In so doing, the apparatus maintains the freshly cooked texture and internal moisture of the food for at least two hours. Food-holding temperatures below 140 degrees F. are biologically unsafe, and above 190 degrees F. typically overcook and ruin food. Radiant heat and warm air convection maintain food at a biologically safe temperature without overcooking it. Warm air curtain 61 thermally insulates holding area 13, creates negative pressure by virtue of a Bernoulli effect that lowers the static air pressure around food items in holding area 13, and removes moisture from holding area 13. Warm air convection and the lowered static air pressure evaporate and remove excess moisture from the food surface, conditioning the food to retain its freshly cooked texture and internal moisture. Food successfully maintained by this apparatus includes crisp fried food (such as french fries, chicken strips, onion rings, popcorn shrimp, and hash brown potatoes), rethermalized fried food (such as frozen pre-fried french fries baked in a convection oven), baked food (such as bread, buns, biscuits, rolls, egg rolls, croutons, cookies, and other baked food). Inedible objects successfully maintained by this apparatus include plates, cups, napkins, eating utensils (such as knives, forks, and spoons), and drinking glasses.

FIGS. 1 through 4 show an embodiment of holding apparatus 10. The material of apparatus 10 may be corrosion-resistant metal (such as stainless steel), ceramic, glass, stone, minerals, brick, or any other corrosion-resistant material able to withstand operating temperatures of apparatus 10 and salt from the food. To resist corrosion, the material may be stainless steel type 304 in one embodiment, and stainless steel type 316 in another embodiment. Apparatus 10 may be configured in any shape (such as circular, oval, triangular, or globular), FIGS. 1 through 4 showing apparatus 10 as having a rectangular shape.

Removable food holder 20, for holding food and inedible objects, nests within holding area 13 of apparatus 10. Food holder 20 supports food, admits radiant heat and warm convection air to the food, and provides conditions that facilitate creation of air curtain 61. Food holder 20 may be made of metal, plastic, ceramic, brick, glass, wood, paper, stone, minerals, or any other material capable of withstanding the operating temperatures of holding area 13. Food holder 20 may be configured in any shape and size compatible with that of holding area 13, in one embodiment as a circular food plate (not shown), and in another embodiment as rectangular food bin 21. An embodiment of food bin 21 is open at the top and comprises a bottom base section 22 and at least one upright wall 23. One embodiment of food bin 21 has an optional handle 24 that facilitates safe removal of food bin 21 from holding area 13.

One embodiment of food holder 20 includes removable top shield 26 which radiates heat received from warm convection air and from warm air curtain 61 to food having a desirably moist external surface (such as sautéed onions; scrambled eggs; cooked fruit, vegetables, and meat; and casseroles) held in food holder 20 and shields the food from the drying Bernoulli effect of warm air curtain 61. Shield 26 may be made of any material (such as stainless steel, plastic, ceramic, glass, brick, stone, or minerals) able to withstand the operating temperatures of holding area 13 and to radiate an amount of heat sufficient to maintain food held in food holder 20 at a satisfying, biologically safe temperature without overcooking the food. An embodiment of shield 26 contains apertures that let excess moisture escape from food holder 20. In one embodiment, one shield 26 is positioned atop each food bin 21. In another embodiment (shown in FIG. 10), edges of shield 26 slide into indentations 65 of side wall 36 of food-holding area 13 such that one shield 26 is positioned near, but above, multiple food bins 21 nested within holding area 13, allowing workers easy access to food bins 21.

Apparatus 10 comprises air flow assembly 79 that includes heater 68, air blower 70, and chamber 12 which defines air channel 74. Air flow assembly 79 produces and recirculates a flow of warm air through air channel 74, which has four portions (shown in FIG. 3)—holding portion 75 for holding and maintaining food; blower directing portion 76 for guiding air flow from holding portion 75; base portion 77 positioned below holding portion 75 for guiding air flow from blower directing portion 76 and for radiating heat received from the warm air flow to holding portion 75; and air exhaust portion 78 for receiving air from the base portion and for guiding air to holding portion 75. In one embodiment, air flow assembly includes insulating external cavity wall 73, closed at the top and sides, that encloses the bottom and lateral periphery of air channel 74, and fluidly communicates with air channel 74 air stored in cavity wall 73 and warmed by the recirculating warm air. Air blower 70, located near or in blower directing portion 76, impels air flow from blower directing portion 76 through heater 68, located in base portion 77, into base portion 77 to create a flow of warm convection air that recirculates through air channel 74.

Figure 1:
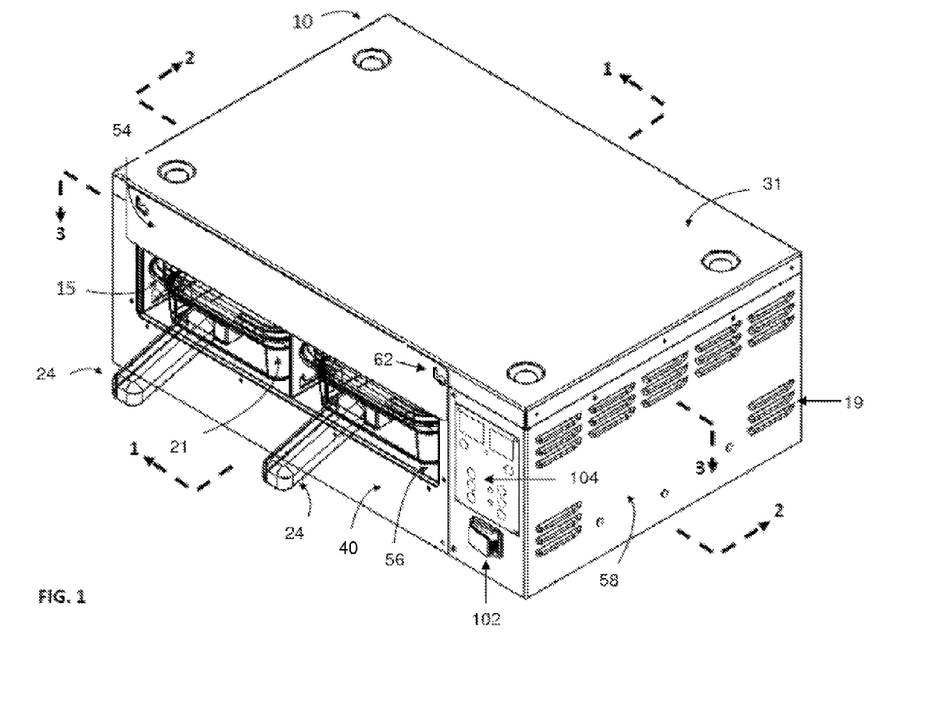
FIG. 1 is a perspective view of the food-holding apparatus.
Figure 2:
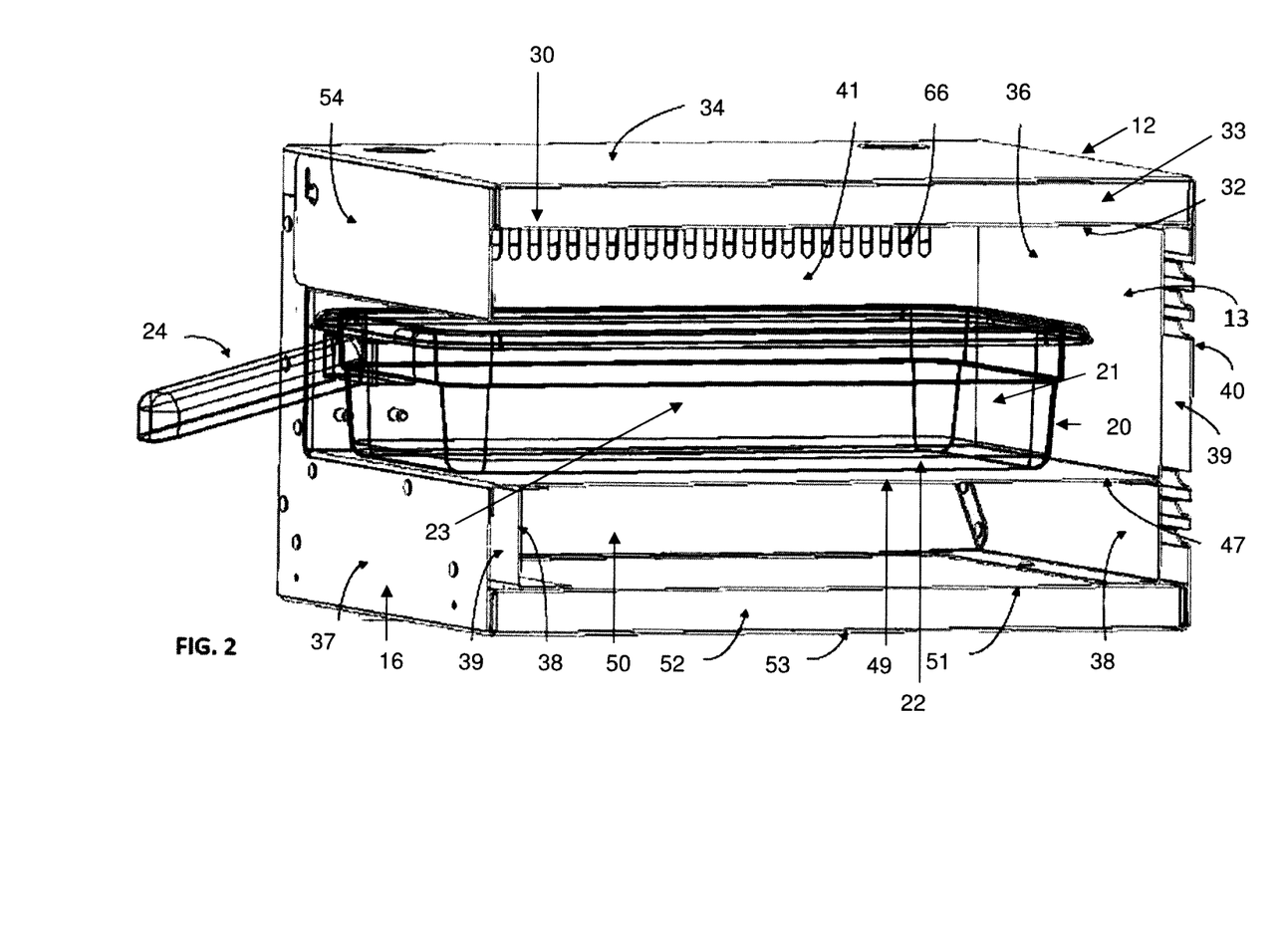
FIG. 2 is a sectional view of the apparatus, taken on cutting plane lines 1-1 of FIG. 1.
Figure 3:
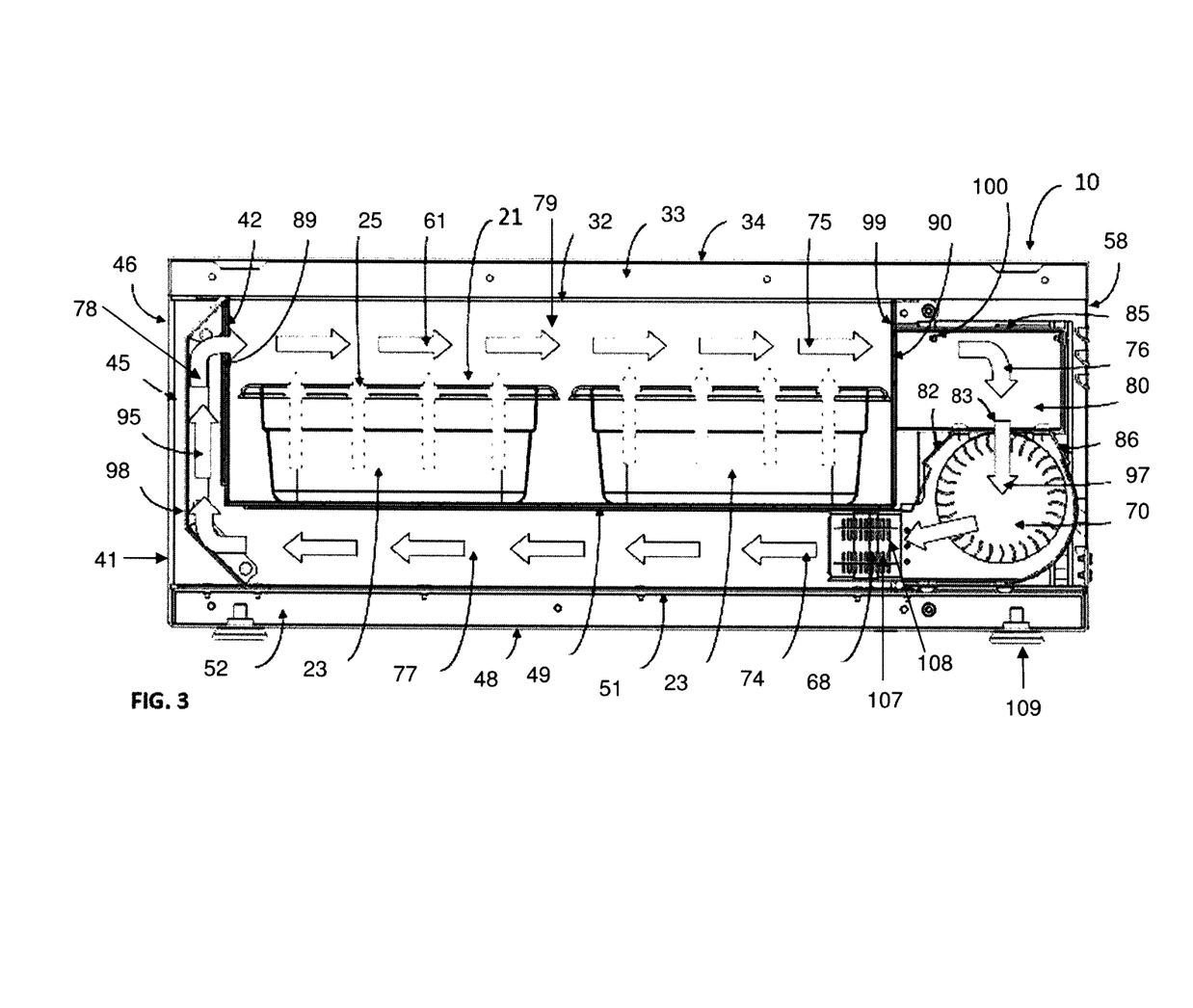
FIG. 3 is a sectional view of the apparatus, taken on cutting plane lines 2-2 of FIG. 1, illustrating a recirculating air flow.
Figure 4:
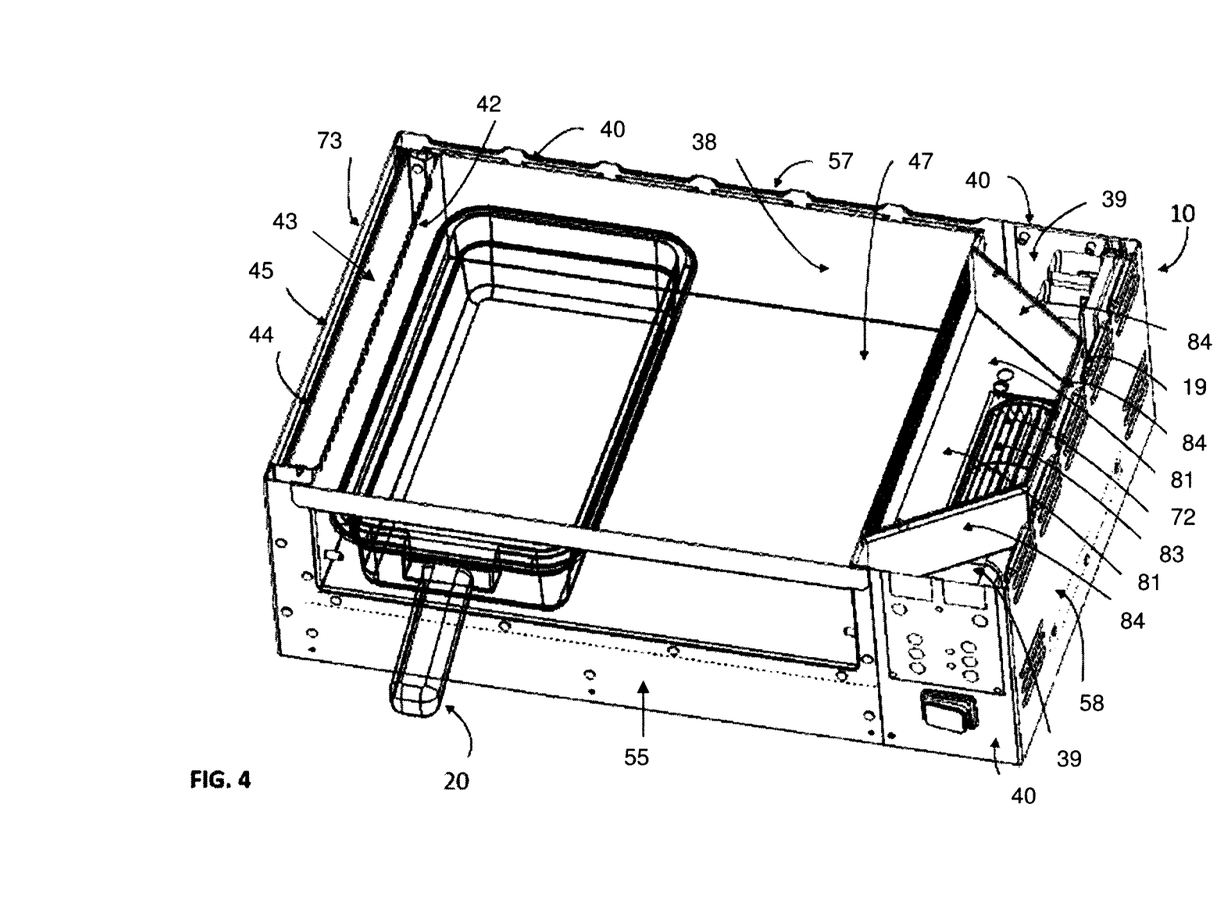
FIG. 4 is a sectional view of the apparatus, taken on cutting plane lines 3-3 of FIG. 1.
Figure 5:
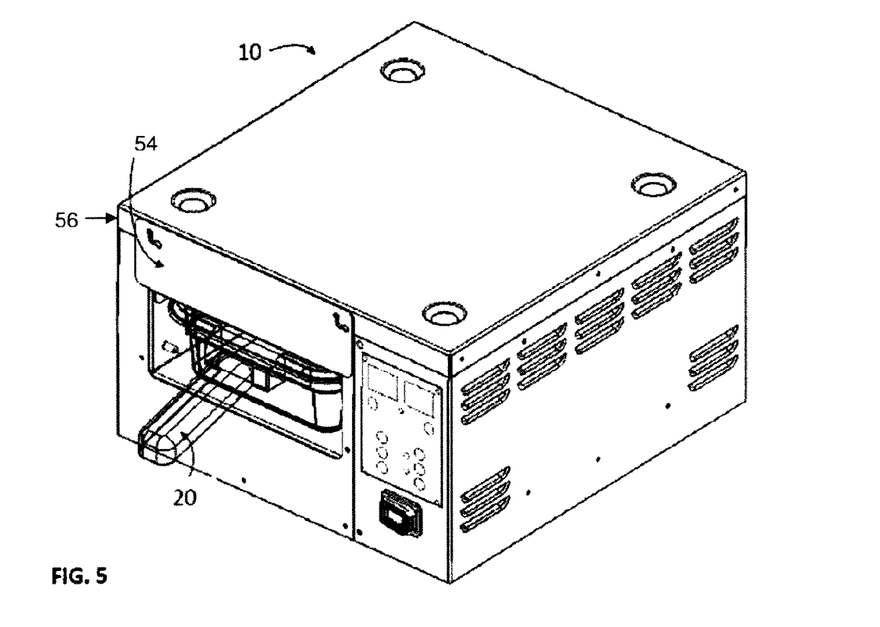
FIG. 5 is a perspective view of the food-holding apparatus with a single food bin.

Apparatus 10 contains at least one holding area 13 that defines air channel holding portion 75—at its top by top wall 30, at its side by side wall 36, and at its base by base wall 47 (as shown in FIG. 2). Base wall 47 is heated from below by base portion 77 of air channel 74 and in turn radiates heat through removable food holder 20 to the food. Side wall 36 includes air outlet port 91 that directs the flow of warm air onto and about cooked food and other items held in holding area 13 to condition the food and items, and that is configured to create a warm insulating air curtain flowing across holding area 13; and includes air inlet port 90 spaced apart from, positioned opposite to, and aligned with air outlet port 91, for releasing air and moisture from holding area 13, and for developing air curtain 61 by drawing and guiding a substantially laminar flow of air from air outlet port 90. Each air port 90, 91 is designed to promote laminar air flow and has in one embodiment from about 20 to about 30 apertures 66 having a height of from about 1 to about 2 inches and a width of from about 0.15 to about 0.25 inches. The length of each air port 90,91 is positioned, in one embodiment (as shown in FIG. 3) horizontally near a top edge of side wall 36, and in another embodiment vertically near a lateral edge of side wall 36. Air ports 90,91 are spaced apart: in one embodiment (shown in FIG. 5) by from about 6 to about 8 inches to accommodate one food bin 21 in holding area 13; in another embodiment (shown in FIG. 1) by from about 15 to about 18 inches to accommodate one or two food bins 21; and in yet another embodiment by from about 18 to about 24 inches to accommodate one, two, or three food bins 21. In various embodiments, the food bins range in height from about 2.5 inches to about 8 inches and in width from about 5 inches to about 22 inches. Top wall 30 thermally insulates holding area 13 and, by preventing upward extension of air curtain 61, guides laminar flow of air curtain 61 between air ports 90,91 to maximize the drying Bernoulli effect of air curtain 61.

In one embodiment, top wall 30 of holding area 13 is innermost section 32 of top cavity wall 31; side wall 36 includes both innermost section 38 of side cavity wall 37 and innermost section 42 of air outlet double cavity wall 41; and base wall 47 includes innermost section 49 of base double cavity wall 48. Each cavity wall 31,37 includes a pair of wall sections spaced apart by an insulating cavity comprised of: top cavity wall 31 comprising innermost wall section 32, top cavity 33, external wall section 34, and closure 56 that joins adjacent innermost 32 and external 34 sections to enclose cavity 33 and prevent heat loss; and side cavity wall 37 comprising innermost wall section 38, side cavity 39, external wall section 40, and closure 56 that joins the top of adjacent innermost 38 and external 40 wall sections to prevent heat loss. An embodiment of side cavity wall 37 (shown in FIG. 2) has three segments (shown in FIG. 4): front segment 55, back segment 57, and control panel segment 58 which is positioned opposite air outlet double cavity wall 41. Air inlet port 90 is located near the top of innermost wall section 38 of control panel segment 58.

Each double cavity wall 41,48 comprises three wall sections spaced apart by two cavities: air outlet double cavity wall 41 comprising innermost wall section 42, air channel cavity 43, middle wall section 44, insulating cavity 45, external wall section 46, closed at the top in one embodiment by top cavity wall 31; and base double cavity wall 48 comprising innermost wall section 49, air channel cavity 50, middle wall section 51, insulating cavity 52, external wall section 53, closed at the sides in one embodiment by side wall 36. Air outlet port 91 is located in the innermost wall section 42 of the air outlet double cavity wall 41.

Wall cavities 33, 39, 45, and 52 contain an insulating material (such as air, mineral wool, polystyrene beads or granules, or rubber foam) to prevent heat loss from holding area 13 and to lessen the temperature of exterior surfaces. Side cavity 39 and insulating cavities 45,52 are continuous, allowing stored air warmed by the circulating flow of warm air to move freely within them. External cavity wall 73, in one embodiment, comprises side cavity wall 37; the external wall section 46, insulating cavity 45, and middle wall section 44 of air outlet double cavity wall 41; and external wall section 53, insulating cavity 52, and middle wall section 51 of base double cavity wall 48. In one embodiment, external wall sections 34,40,46, 53 have air venting louvers 19 for releasing heat and moisture from within food-holding apparatus 10.

At least one opening 15 in holding area 13 provides workers with easy access to food held in food holder 20 and facilitates cleaning of holding area 13. One embodiment of holding area 13 (such as that shown in FIG. 1) having one opening 15 in side cavity wall 37 is further defined by top cover 54 and closure 56. Top cover 54 thermally insulates holding area 13 and sets the height of opening 15 to admit only food holders 20 having a height, and holding an amount of food, conducive to formation of a robust warm air curtain 61 flowing above food holders 20 and to prevention of introducing food particles into air ports 90,91. In one embodiment, the distance from the top of food bin 21 to top wall 30 of holding area 13 is from about 1 to about 3 inches. Top cover 54 is in one embodiment (shown in FIG. 1) detachably joined to top cavity wall 31 by fasteners (such as stubs 62, hooks, snaps, screws, bolts, or Velcro), in another embodiment permanently joined (such as by welding, soldering, or applying adhesive) to top cavity wall 31, in another embodiment detachably joined to side wall 37 (such as by stubs 62, hooks, snaps, screws, bolts, or Velcro), and in another embodiment permanently joined (such as by welding, soldering, or applying adhesive) to side wall 37. Closure 56, in one embodiment, extends base wall 47 of holding area 13 to external section 40 of side cavity wall 37 by joining external 40 and innermost 38 sections of side cavity wall 37. Holding area 13 has in one embodiment two openings 15, one in front side 16 of side cavity wall 37 and one in the back side of side wall 37; in another embodiment two openings 15, one in top cavity wall 31 and one in side cavity wall 37; and in yet another embodiment three openings 15, one in side cavity wall 37 of front side 16 of apparatus 10, one in side cavity wall 37 of the back side of apparatus 10, and one in top cavity wall 31.

Figure 12:
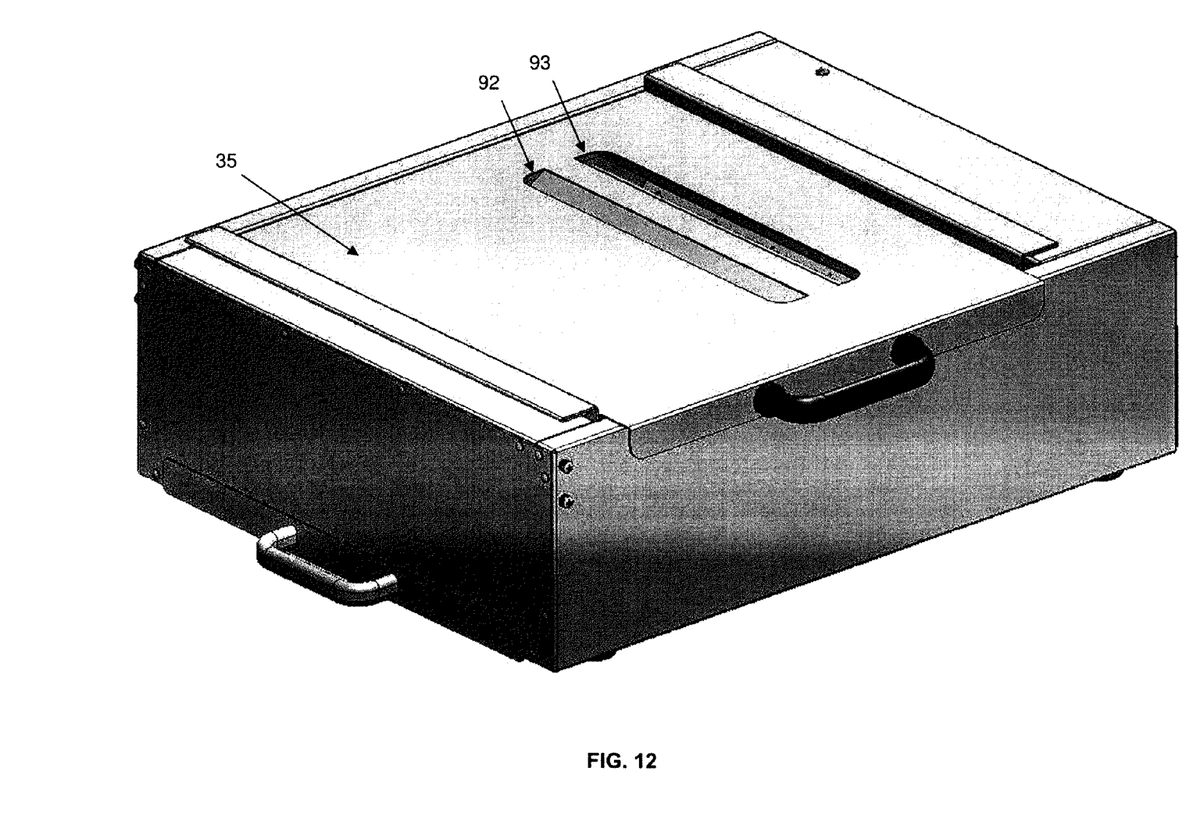
FIG. 12 is a perspective view of the apparatus having a lid.

An embodiment of holding area 13 having opening 15 in top wall 30 is further defined by lid 35, which covers the opening to thermally insulate holding area 13, to maximize the Bernoulli effect of warm air curtain 61, and to protect food from the environment. Lid 35 is, in one embodiment, removable from top wall 30, and in another embodiment hingedly fixed to top wall 30, and in yet another embodiment hingedly fixed to side wall 36. In one embodiment, lid 35 is entire top wall 30 of holding area 13. One embodiment (shown in FIG. 12) of lid 35 has air outlet vent 92 which lets warm moist air escape from holding area 13, and air inlet vent 93 which lets cool dry air enter into holding area 13. The lengths of air vents 92,93 lie perpendicular to the flow of air curtain 61 of holding area 13, which in one embodiment extend to within about 3 inches of the edge of lid 35, are each about 1 inch wide and angled from about 10 to about 30 degrees relative to the surface of lid 35, are positioned such that air outlet vent 92 lies closer than air inlet vent 93 to air outlet port 91 of holding area 13, and are positioned at about ⅔ the length of air curtain 61 from air outlet port 91.

Figure 9:
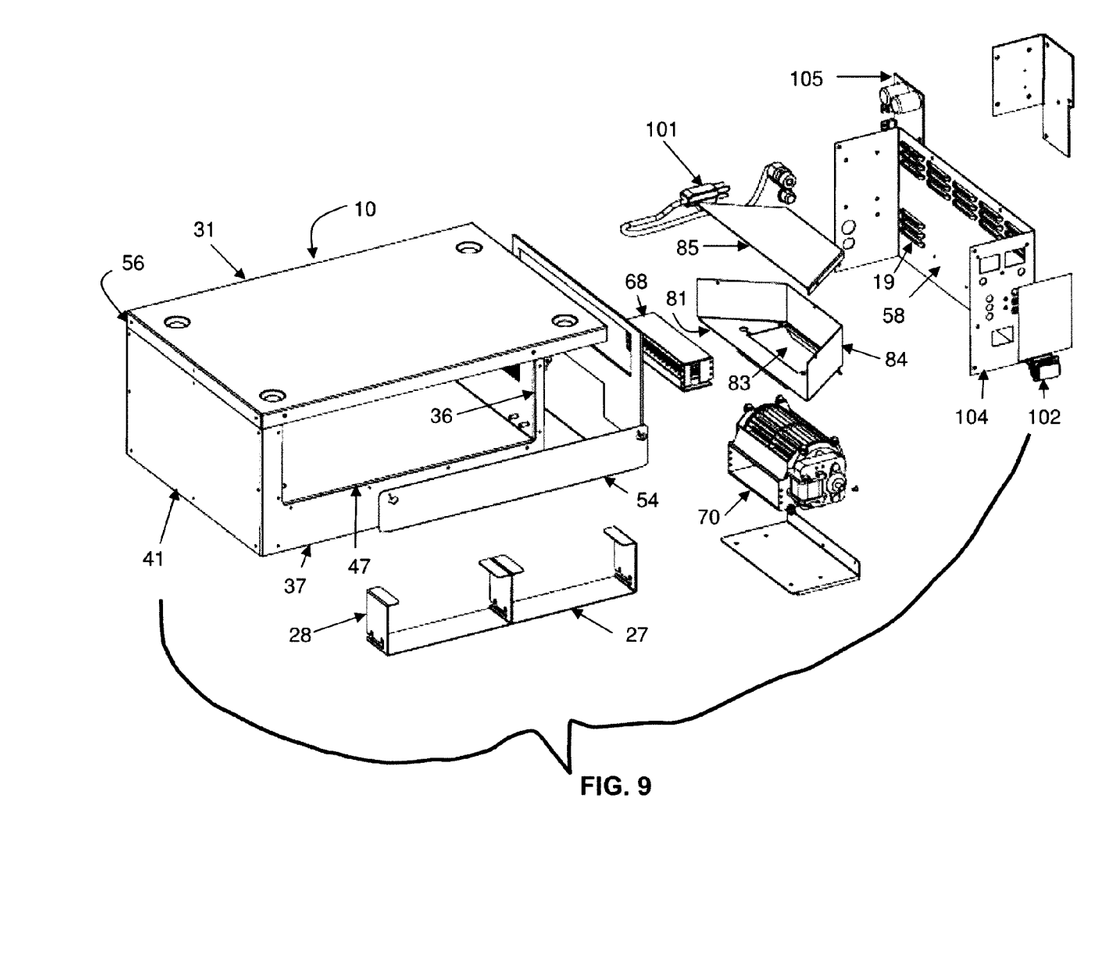
FIG. 9 is an exploded view of FIG. 1.
Figure 11:
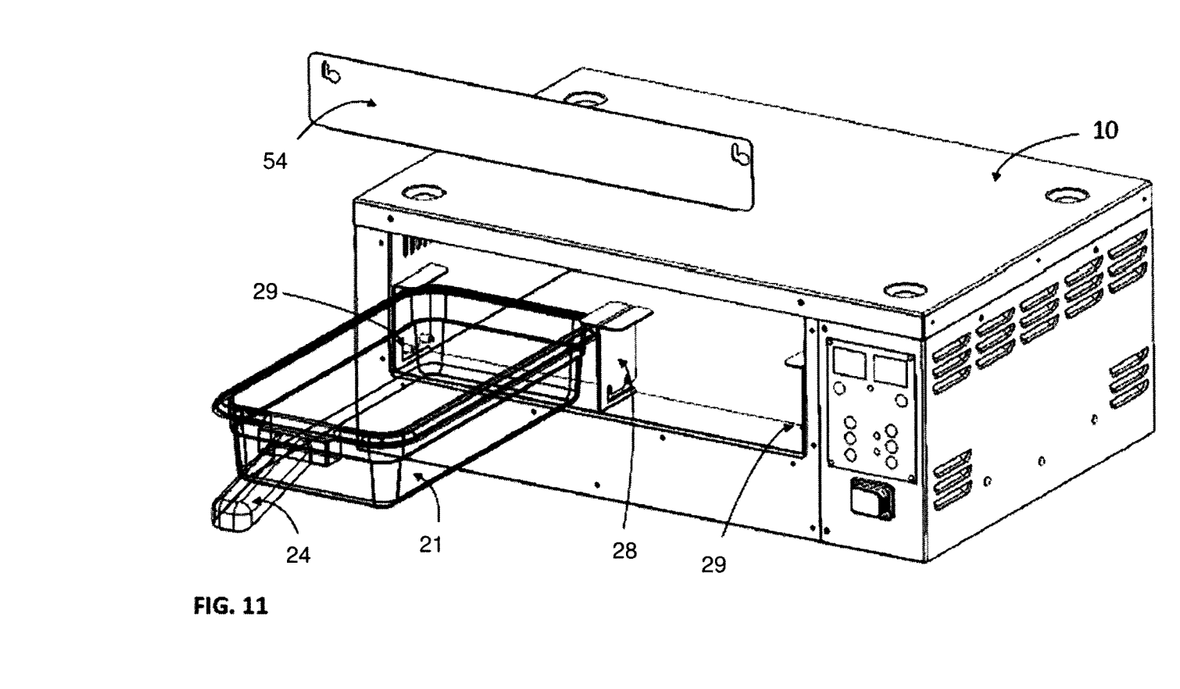
FIG. 11 is an exploded view of the apparatus depicting use of a food bin chute.

An optional food bin chute 28 reversibly secures food bin 21 to apparatus 10 to help workers safely remove food from food bin 21. Chute 28 is joined to a wall (in one embodiment side wall 36, and in another embodiment bottom wall 47, and in another embodiment top wall 30, and in a further embodiment external wall section 40 of side cavity wall 37) or closure 56 of apparatus 10, fixedly in one embodiment by welding, and detachably in another embodiment (to facilitate cleaning of holding area 13) by fasteners (such as pins 29). Chute 28 is positioned horizontally in one embodiment (shown in FIG. 11), vertically in another embodiment (not shown); outside apparatus 10 in one embodiment (also not shown), and within holding area 13 in another embodiment. Tests show that positioning chute 28 outside apparatus 10 results in unsafely hot food bin handles 24. Chute 28 includes angled brackets, through which food bin 21 may be inserted into food holding area 13, and in one embodiment (shown in FIG. 9) includes linker 27 for joining the brackets. For horizontally positioned chute 28, linker 27 is positioned, in one embodiment (shown in FIG. 11) at the bottom of chute 28, and in another inverted embodiment at the top of chute 28. In one embodiment, linker 27 is positioned at the top of the horizontal chute and is elongated to cover and shield desirably moist food held in food bin 21 from drying due to the Bernoulli effect of warm air curtain 61.

Figure 6:
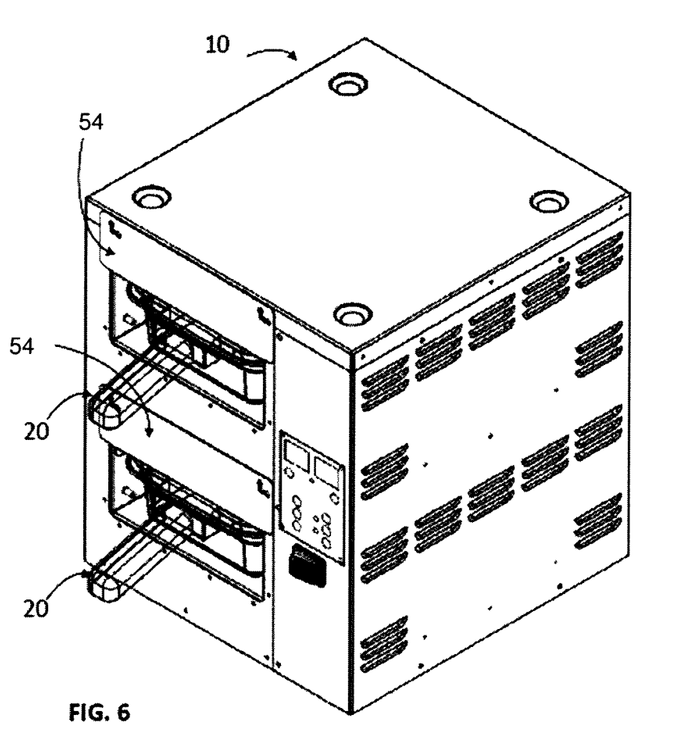
FIG. 6 is a perspective view of the food-holding apparatus in a double-stacked single bin configuration.

Apparatus 10 may contain as many holding areas 13 as may be covered by warm air curtain 61; one embodiment (shown in FIG. 5) having one holding area 13, and another embodiment (shown in FIG. 6) having two holding areas 13. Holding area 13 may contain as many food holders 20 as may fit on base wall 47; one embodiment (shown in FIG. 5) containing one food bin 21, and another embodiment (shown in FIG. 1) containing two food bins 21.

Figure 8:
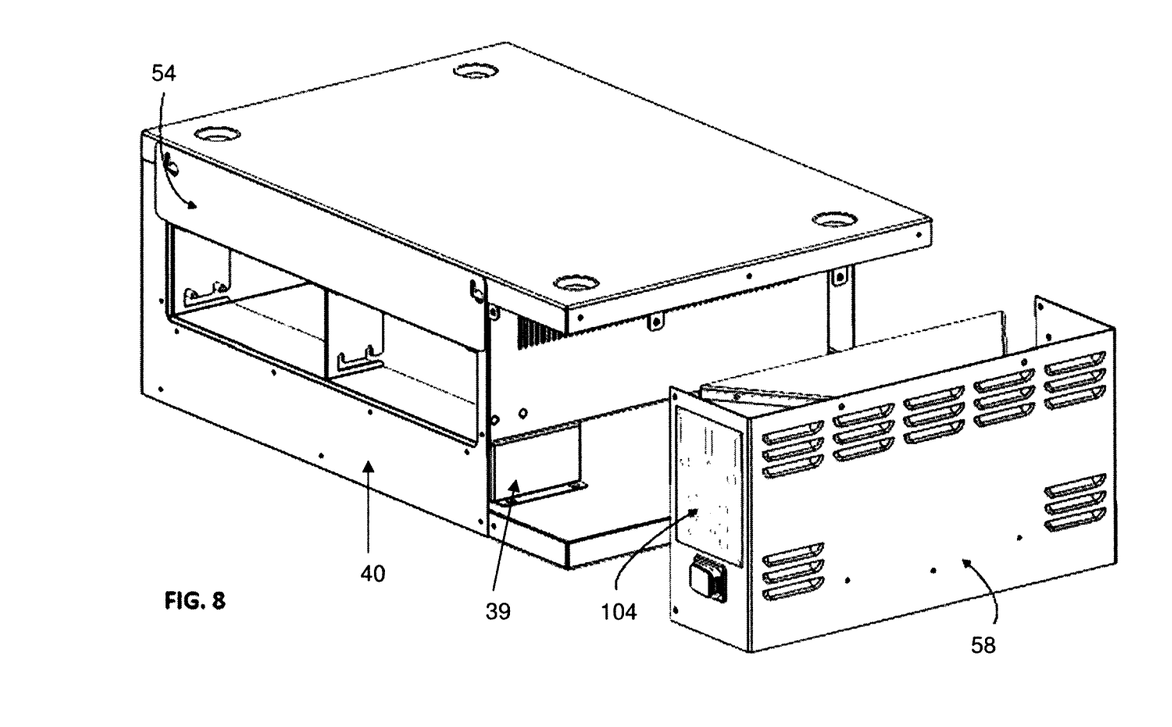
FIG. 8 is a sectional view of the food-holding apparatus with the control panel detached from the apparatus.

To facilitate cleaning and repair of apparatus 10, one embodiment of external wall section 40 of control panel segment 58 of side cavity wall 37 is detachably joined (as shown in FIG. 8) to front 16 and back sides of external wall section 40 of side cavity wall 37 and is joined to control panel segment base 59 positioned within side cavity 39 of control panel segment 58 above middle wall section 51 of base double cavity wall 48.

Figure 7:
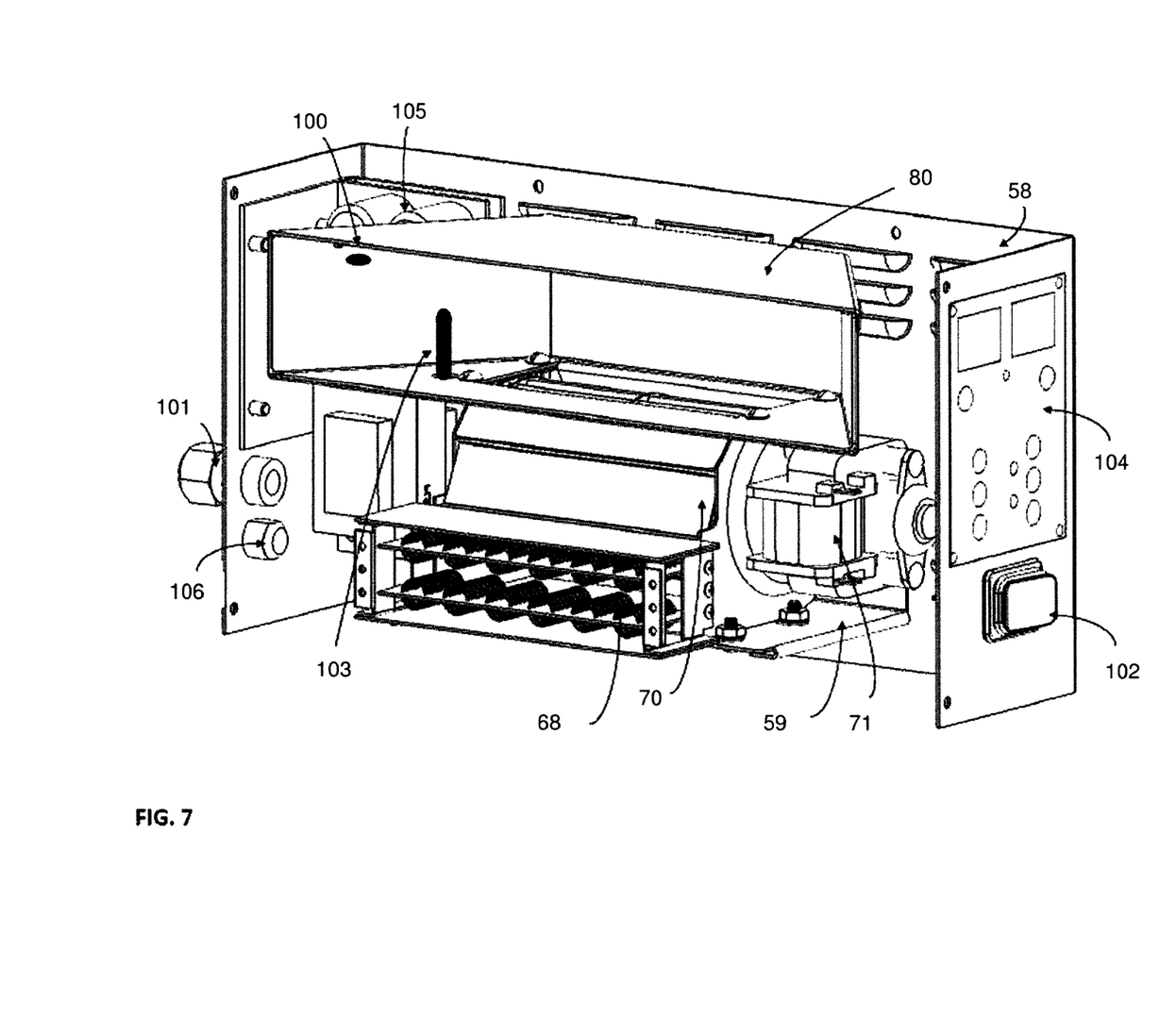
FIG. 7 is a sectional view of the control panel.

Air blower 70 (such as a cross-flow fan shown in FIG. 7, an axial-flow fan [not shown], or a radial-flow fan [not shown]) operated by attached air blower motor 71 is positioned above control panel segment base 59. Air blower 70 is detachably joined, in one embodiment to control panel segment base 59, and in another embodiment to external wall section 40 of control panel segment 58. Air blower 70 forces air through adjacent heater 68 (such as a wire heater or a calrod heater), positioned within air channel cavity 50 of base double cavity wall 48 and supported by control panel segment base 59, to produce a flow of warm convection air in air channel cavity 50. In one embodiment, heater 68 is detachably joined to air blower 70. Complementary operational alignment of air blower 70 with heater 68 compensates for any functional asymmetry in either device to produce a symmetric flow of warm air through air channel cavity 50.

Air inlet 72 of air blower 70 abuts and receives air 97 from opening 83 in base 81 of air funnel 80, positioned within blower directing portion 76 of air channel 74, and in one embodiment within side cavity 39 of control panel segment 58. In one embodiment, blower 70 is joined to base 81. Angled side wall 84 of air funnel 80, which in one embodiment is attached to external wall section 40 of control panel segment 58, abuts and directs air flow from air inlet port 90 to opening 83 in funnel base 81. One embodiment of air funnel 80 has top wall 85 joined to side wall 84. Under standard operating conditions (i.e., conditions favorable to routine operation of the apparatus), extensions 82 of the funnel base (which are represented by flanges of the base 81 in one embodiment and brackets attached to the base 81 in another embodiment) downwardly directed from opening 83 in funnel base 81 restrict the flow of air from air blower 70 to only air channel cavity 50 of base double cavity wall 48. One embodiment of funnel 80 includes optional ultraviolet light 100, for converting air impurities (such as oil droplets, food particles, and bacteria) to harmless fine ash, positioned within interior of the funnel and attached to wall 84, 85 or base 81 of air funnel 80 or to external wall section 40 of control panel segment 58.

Apparatus 10 needs no electrical temperature-regulating device (such as a thermostat or thermocouple) to achieve and maintain a stable performance after from about 2 to about 3 hours of operation under standard conditions or under adverse conditions having an operating temperature within at least 20 degrees F. of the standard operating temperature. Air channel 74 dimensions and apertures, insulation material and venting louvers of air cavity wall 73, the air curtain, and functionally compatible heater 68 and air blower 70 cooperate to create operational stability in the absence of a thermostat. For example, an embodiment of apparatus 10 having within base portion 77 of air channel 74 a heat displacement factor of from about 2 to about 3 Watts per cubic inch and an air velocity of from about 400 feet per minute to about 800 feet per minute, and having within air exhaust portion 78 of air channel 74 and air velocity of from about 400 feet per minute to about 800 feet per minute maintains thermal stability over a range of from about 400 Watts to about 800 Watts of heat output and over a 20 degree F. variation in room temperature.

One embodiment (such as that shown in FIG. 7) of apparatus 10 includes electrical controls (such as electrical receptacle 101, power switch 102, thermocouple 103, electrical control board 104, power board 105, reset fuse 106, and electrical ground 109). In one embodiment, the controls are detachably joined to external wall section 40 of control panel segment 58 and are supported by control panel segment base 59. Electrical receptacle 101 admits electric current to apparatus 10. Power switch 102 turns the apparatus on and off. Reset fuse 106 protects apparatus 10 from harmful surges of electrical current. Thermocouple 103 controls the air temperature of apparatus 10 by measuring air temperature and by signaling that measurement to electrical control board 104. Control board 104 compares the measured temperature to a temperature set by an operator and signals power board 105 to supply, in one embodiment, heater 68 with an amount of electrical power needed to generate an amount of heat, and in another embodiment air blower motor 71 with an amount of electrical power needed to oscillate at a frequency, needed to achieve the set temperature. Thermocouple 103 is positioned, in one embodiment, within air funnel 80, and in another embodiment within air channel cavity 50 of base double cavity wall 48, and in yet another embodiment within air channel cavity 43 of air outlet double cavity wall 41. In food holding area 13, maintaining food at a desired temperature of from about 140 degrees F. to about 190 degrees F. (preferably from about 155 degrees F. to about 175 degrees F.) typically requires at the air outlet port 91 an air temperature of from about 225 degrees F. to about 350 degrees F. (preferably from about 265 degrees F. to about 285 degrees F.) and an air velocity of from about 500 to about 1500 feet per minute (preferably from about 800 to about 1200 feet per minute).

Mechanical thermostat 107 and single-use shut-off fuse 108 are safety devices that protect apparatus 10 from overheating under destructive conditions (such as a grease fire) by preventing the flow of electric current to heater 68 and to air blower motor 71. Thermostat 107 is set to operate at a temperature at least 20 degrees F. higher than the highest standard operating temperature of apparatus 10 measured at thermostat 107. At this set temperature, thermostat 107 is typically closed, making thermostat 107 durable. Thermostat 107 is positioned, in one embodiment within heater 68, and in another embodiment within air channel cavity 50 of base double cavity wall 48, and in yet another embodiment within air channel cavity 43 of air outlet double cavity wall 41. Single-use shut-off fuse 108 is positioned within heater 68 and is set to operate at a temperature at least 25 degrees F. higher than the operating temperature of thermostat 107.

FIG. 3 shows an embodiment of air flow assembly 79 that produces and recirculates a flow of warm air through apparatus 10. Ranges of air velocity and air temperature described here apply to an embodiment in which air inlet port 90 and oppositely aligned air outlet port 91 of holding area 13 are spaced apart by from about 12 inches to about 15 inches. Increased spacing of air ports 90, 91 requires increased heat, air velocity, or air volume; decreased spacing requires decreased heat, air velocity, or air volume. Air velocity and air volume can be changed by changing the rotation frequency of air blower 70, the size of air ports 90, 91, and the structure of air cavities 39, 43, and 50. The amount of heat can be changed by changing the wattage of heater 68.

Figure 10:
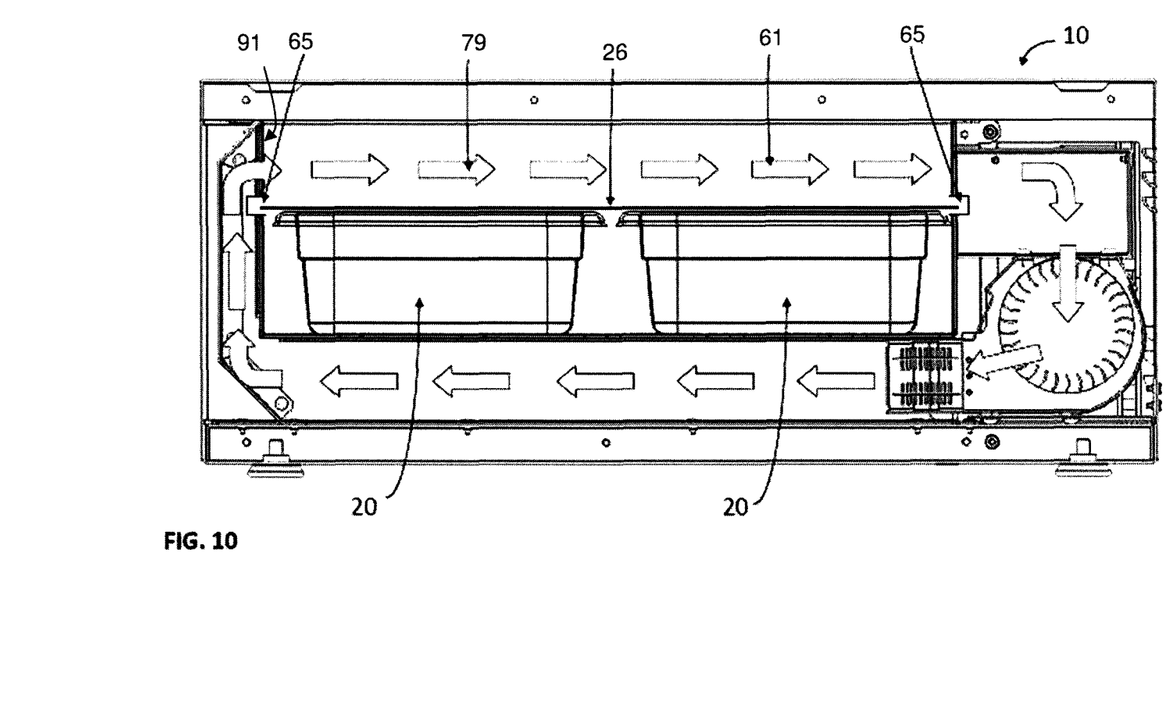
FIG. 10 is a sectional view of the apparatus depicting use of a shield for holding externally moist food in the apparatus.

Under standard operating conditions, air circulates through four portions of air channel 74 of air flow assembly 79 (as shown in FIGS. 3 and 10)—blower directing portion 76, base portion 77, air exhaust portion 78, and holding portion 75. Air blower 70 creates a slightly negative air pressure in air funnel 80 as it draws air 97 from air funnel 80, and creates a flow of warm convection air in air channel cavity 50 (sized to accommodate an air velocity of from about 400 to about 700 feet per minute and to provide a heat displacement factor of from about 2.2 to about 3.2 Watts per cubic inch, preferably 2.75 Watts per cubic inch) of base double cavity wall 48 as it forces air 97 through heater 68. Air flow through air channel cavity 50 uniformly heats base wall 47 of holding area 13 to a temperature of from about 150 degrees F. to 180 degrees F. and base wall 47 radiates heat through food holder 20 to warm food in food holder 20. Angled segments 98 of middle section 44 of air outlet double cavity wall 41 maintain the laminar flow of air as the air accelerates (because air outlet air channel cavity 43, in one embodiment, is constricted relative to base air channel cavity 50) upward 95 to air outlet port 91. Air outlet port 91 has from about 20 to about 30 oval holes that promote laminar air flow, each hole having a height of from about 1 to about 2 inches and a length of from about 0.15 to about 0.25 inches. Angled segment 98 and optional air outlet port guiding bracket 89 deflect a portion of the flow of warm convection air through air outlet port 91 into holding area 13, in one embodiment at a downward angle of from about 0 degrees to about 30 degrees (more particularly from about 10 degrees to about 30 degrees), at a temperature of from about 225 degrees F. to about 350 degrees F. (more particularly from about 190 degrees F. to about 210 degrees F.), and at a velocity of from about 800 to about 1200 feet per minute. The flowing air warms, and removes moisture from, the surface of food (not shown) held in food holder 20. Undeflected air flowing through air outlet port 91, in one embodiment, across the top of food-holding area 13 and above food holder 20 (or in another embodiment, air flowing along the side of holding area 13 and to the side of food holder 20) as robust air curtain 61 removes moist air from holding area 13 and creates negative pressure through a Bernoulli effect that helps to evaporate moisture from the crisp food surface. Top wall 30 of holding area 13, by preventing upward extension of air curtain 61, helps to maintain the laminar air flow, and to increase the moisture-evaporating Bernoulli effect, of air curtain 61. The combination of radiant heat, warm air convection, and warm air curtain 61 and its resulting Bernoulli effect maintain a crisp food surface, internal food moisture, and a food temperature of from about 140 degrees F. to about 190 degrees F. Positive air pressure at air outlet port 91 and negative air pressure at air inlet port 90 create and maintain the laminar flow of air curtain 61. Air in holding area 13 exits holding area 13 by flowing through air inlet port 90 and air filter 99 into air funnel 80. Angled side walls 84 of air funnel 80 promote laminar air flow as they guide warm flowing air 88 to opening 83 in base 81 of air funnel 80. Extensions 82 of air funnel base 81 prevent unfiltered air from entering air blower 70.

Under adverse operating conditions (such as a blocked air port 90, 91), air blower 70 acts as a differential pressure switch to change the direction of air flow so that the apparatus 10 continues to properly condition food. Air blower 70 responds to greatly negative air pressure in air funnel 80 resulting from a blocked air inlet port 90 by drawing, through space 86 beneath extensions 82 of air funnel base 81, warm air from side cavity 39 instead of from air funnel 80. Air blower 70 responds to greatly positive air pressure in air channel cavity 50 of base double cavity wall 48 resulting from blocked air outlet port 91 by blowing, through space 86 beneath extension 82 of air funnel base 81, warm air into side cavity 39 instead of into air channel cavity 50.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for maintaining the condition of cooked food, comprising:
   a chamber defining an air channel, said air channel configured to recirculate a flow of warm air within said chamber,
      said chamber having a holding portion configured to hold cooked food, comprising
         a base wall, adapted to radiate heat to the cooked food;
         a side wall, including
            an air outlet, configured to direct the warm air flow onto and about the cooked food, and configured to create a warm insulating air curtain flowing across the holding portion, and
            an air inlet aligned with the air outlet, adapted to release air and moisture from the holding portion and to receive the air curtain from the air outlet; and
         a top wall, configured to guide the air curtain between said air outlet and said air inlet;
      said chamber including a blower directing portion adjoining the air inlet, for guiding an air flow from the holding portion through the air inlet;
      said chamber including a base portion positioned below said base wall and adjoining said blower portion, for guiding an air flow from the blower directing portion, said base portion configured to transfer heat from the air flow to said base wall; and
      said chamber including an air exhaust portion adjoining said base portion and said air outlet, and configured to guide air flowing from the base portion to the holding portion; and
   a forced warm air convection mechanism, including
      a blower positioned proximate said blower directing portion adapted to receive air from the blower directing portion, said blower capable of operating to impel air flow into said base portion; and
      a heater, operationally aligned with said blower, and positioned within said base portion to heat air.

2. The apparatus of claim 1, further comprising an air funnel, positioned within said blower directing portion of said air channel, for directing warm flowing air received through said air inlet from said holding portion to said blower.

3. The apparatus of claim 1, further comprising an air filter, positioned within said blower directing portion of said air channel between said air inlet and said blower, for removing impurities from the warm flowing air.

4. The apparatus of claim 1, further comprising an ultraviolet light, positioned within said blower directing portion of said air channel, for burning air impurities.

5. The apparatus of claim 1, further comprising a removable food holder, for holding food within said holding portion.

6. The apparatus of claim 1, further comprising an external wall, spaced apart from said chamber and joined at the top to said chamber, configured to surround and insulate the lateral periphery of said air channel and to store air, warmed by the recirculating warm air flow, in fluid communication with the air channel.

7. The apparatus of claim 6, wherein said external wall and said side wall of said holding portion are configured to form an opening for allowing access to said holding portion, further comprising a top cover joined to said external wall or to said holding portion, positioned to form the top of the opening and to admit through the opening to said holding portion cooked food having a height conducive to maintenance of the warm air curtain.

8. The apparatus of claim 6, wherein said external wall and said top wall of said holding portion are configured to form an opening for allowing top access to said holding portion, further comprising a lid for reversibly covering the opening, insulating said holding portion, and guiding the warm air curtain between said air outlet and said air inlet.

9. The apparatus of claim 1, further comprising electrical controls, including an electrical receptacle and an electrical ground, for controlling operation of the apparatus.

10. The apparatus of claim 9, further comprising a control panel joined to said electrical controls, for consolidating said electrical controls.

11. The apparatus of claim 10, wherein said blower directing portion comprises said control panel, for consolidating said electrical controls and said blower.

12. The apparatus of claim 10, wherein said control panel is detachably joined to the apparatus to facilitate cleaning and repair of the apparatus.

13. The apparatus of claim 7, wherein
   material of the apparatus is stainless steel configured to have a rectangular shape;
   said external wall is configured to form air venting louvers, for releasing heat and moisture from the apparatus;
   said blower is joined to said heater;
   further comprising
      an air funnel, positioned within said blower directing portion of said air channel, for directing warm flowing air received through said air inlet from said holding portion to said blower;
      an optional air filter, positioned between said air inlet and said blower, for removing impurities from the warm flowing air;
      an optional ultraviolet light, positioned within said blower directing portion of said air channel, for burning air impurities;
      a top cover, joined to said external wall or to said holding portion, positioned to form the top of the opening to admit through the opening to said holding portion cooked food;
      a removable food holder, having an optional handle, for holding food in said holding position;
      a shield, composed of stainless steel optionally configured to form apertures, for shielding desirably moist food in said holding portion from the flowing warm air and for radiating heat to the food;
      an optional food bin guide joined by pins to said holding portion or to said external wall, for stably positioning said food holder within said holding portion;
      a detachable electrical control panel positioned within said blower directing portion, for facilitating cleaning and repair of the apparatus;
      electrical controls attached to said control panel, for controlling operation of the apparatus, including an electrical receptacle, an electrical ground, a power switch, an electrical control board, a power board, a reset fuse, a thermocouple, a high temperature mechanical thermostat set to operate at least 20 degrees F. above the standard operating temperature of the apparatus, and a single-use high temperature shut-off fuse set to operate at least 25 degrees F. above the operating temperature of the thermostat.

* * * * *